Patented Apr. 6, 1926.

1,579,387

UNITED STATES PATENT OFFICE.

WILLIAM L. OWEN, OF NEW ORLEANS, LOUISIANA, DEDICATED, BY MESNE ASSIGN-MENTS, TO THE PEOPLE OF THE UNITED STATES.

PROCESS FOR THE PRESERVATION OF SUGAR.

No Drawing.   Application filed September 14, 1925.   Serial No. 56,414.

(GRANTED UNDER THE ACT OF MARCH 3, 1883; 22 STAT. L. 625.)

*To all whom it may concern:*

Be it known that I, WILLIAM L. OWEN, a citizen of the United States of America, residing at New Orleans, Louisiana, have invented a new and useful Process for the Preservation of Sugar, of which the following is a specification.

This application is made under the act of March 3, 1883, chapter 143 (22 Stat. L. 625) and the invention herein described and claimed may be used by the Government of the United States or any of its officers or employees in the prosecution of work for the Government, or by any citizen of the United States, without payment to me of any royalty thereon.

This invention relates to a process for the prevention of the deterioration of sugars during storage. It is primarily intended for the protection of raw sugars, but unrefined white sugars may also be treated the same way.

The primary object of the process is to combat the activity of one type of micro-organisms with that of another whose activities are benign rather than injurious as in the case of the former. The mold fungi are the causative agencies in the deterioration of sugars, and I have found that if the molasses films surrounding the sugar crystals are saturated with carbon dioxide gas, the mold fungi are prevented from developing and consequently the sugars do not deteriorate. I have found also that certain types of yeast, known as torulæ (non-sporulating yeast), have the ability of growing in the relatively high density of the molasses films, and that owing to the fact that they form carbon dioxide, and do not attack sucrose, their activities may be utilized to great advantage in preventing sugar deterioration during storage.

Not only do these yeasts by means of the carbon dioxide produced therein hold the mold fungi in check by the saturation of the molasses films surrounding the sugar crystals, but since they form this carbon dioxide principally from levulose, which is a levorotatory sugar as a result of their destruction of levulose, the sugars inoculated with them will tend to increase rather than decrease in polarization. But not only is the deterioration of the sugar prevented by the presence of a sufficient amount of these yeasts, but their destruction of levulose makes the sugar less hygroscopic, since it is levulose that imparts that quality to raw sugars. And since it is levulose, too, that adds largely to the color of raw sugars, the action of the yeast will tend to reduce the color of and whiten the sugar as well as to make it drier.

The process consists in the following steps:

*a.* The propagation of torulæ yeast forms in a special medium, under sterile conditions in a yeast apparatus.

*b.* The storage of this yeast in specially designed intermediate yeast storage tanks constructed as follows: The tanks are cylindrical in shape, and closed at the top so as to prevent the escape of the $CO_2$ from the filming molasses when it is discharged from the yeast apparatus. It is filled by a pipe from the apparatus, the pipe entering from the bottom, the discharge pipe to the daily supply tank, also leads from the bottom of the former tank. The capacity of the intermediate yeast tanks should be so designed that the supply of inoculated molasses required by the factory should be supplied by two of these tanks, sufficient margin being allowed so that one of the tanks can be thrown out of service at definite intervals for cleaning. As one of these tanks is emptied, the other is being inoculated from the apparatus, so that its contents may reach the desired condition of fermentation necessary for its use as filming material for the sugars. Where the size of the factory using this process would require such large quantities of filming material as to make the size of the tanks inconvenient if the entire capacity is divided between only two tanks, the installation should be doubled, tripled or quadrupled as the case may warrant.

*c.* The mixing of the yeast with molasses to obtain a spray material; the proportion of yeast to sugar is 1:10,000.

*d.* The spraying of this spray material in the desired quantities upon the sugars, after purging them in the centrifugal, i. e., after separating the crystals from the original mother liquor.

*e.* The return of the excess of the yeast back into the process.

The process is continuous, by reason of the fact that the amount of yeast developed at the different stages is always proportionate to the amount required for the daily output of sugar in the factory. The amount of inoculating material that has been found to give best results when used on sugars is 5 per cent, by weight, of a molasses having one million yeast cells per cubic centimeter.

The special torulæ culture isolated for this purpose, on account of its fermentation efficiency, and its capacity to form large amounts of $CO_2$, is propagated in a specially designed yeast apparatus. After from one to two weeks, the contents of the large vessel of the apparatus is discharged into an intermediate yeast tank, of a capacity sufficient to take care of the needs of the factory during the interval necessary to develop a second lot in the apparatus and in a second intermediate yeast tank. Sufficient inoculating material is left in the small vessel of the apparatus to inoculate the contents of the large vessel, after the discharge of the finished contents into the intermediate yeast tank. The yeast or inoculating medium, is next drawn from the intermediate yeast tank into a daily supply tank at the centrifugals, from which it is discharged under $CO_2$ pressure through a spray while the sugars are being purged in the centrifugals. After spinning the centrifugals for a few minutes the excess of the inoculating material is removed and is returned to the intermediate yeast tank for further use.

The efficiency of the fermentation process at any stage is determined by the following conditions, viz. (1) number of torulæ present in the inoculating material from the yeast apparatus; (2) rate of growth of torulæ in the intermediate yeast vat; (3) per cent of free $CO_2$ in the inoculating material; and (4) per cent $CO_2$ in the finished sugar.

The increases in the polarization of sugars inoculated in the protective process gave a net increase in our experiments of between $3.00 and $4.00 per ton computed on the prices of raw sugar on the New York market. But in addition to giving much better keeping sugars, and sugars of better color and less affinity for moisture, the process gives increased initial polarization at practically no expense. Since the molasses used for filming the crystals increases greatly in polarization due to the destruction of the levulose, and since the use of this molasses on the sugar imparts this increase in polarization to the original films, it can readily be seen that the increased polarization has been obtained at practically no cost whatever. As an example of this may be cited an experiment wherein a Cuban molasses increased in polarization eight degrees, and the sugar filmed with it by this process increased 1.4 degrees in polarization.

I claim:

1. In a process for the preservation of white sugar, the step of inoculating such sugars with torulæ yeast.

2. A method for the removal by fermentation of levulose present in white sugars, comprising the inoculation of such sugars with torulæ yeast.

WILLIAM L. OWEN.